(12) United States Patent
Distelhoff et al.

(10) Patent No.: US 6,409,040 B1
(45) Date of Patent: Jun. 25, 2002

(54) FUEL TANK FOR A MOTOR VEHICLE

(75) Inventors: Markus Distelhoff; Karl Eck, both of Frankfurt; Winfried Fröhlich, Bad Camberg; Dieter Keller, Aschaffenburg; Justus Klöker, Neu Anspach; Knut Meyer, Essen; Ingo Mohr, Höhn; Bernd Rumpf, Nidderau-Windecken; Wolfgang Sinz, Sulzbach; Rainer Moser, Idstein, all of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/520,031

(22) Filed: Mar. 6, 2000

(30) Foreign Application Priority Data

Mar. 17, 1999 (DE) .......................................... 199 11 877

(51) Int. Cl.$^7$ ................................................ B65D 1/00
(52) U.S. Cl. ...................... 220/562; 220/4.14; 220/4.15
(58) Field of Search ................................ 220/4.14, 4.15, 220/562, 567.2, 23.9, 23.91

(56) References Cited

U.S. PATENT DOCUMENTS

| | | | | |
|---|---|---|---|---|
| 2,403,836 A | * | 7/1946 | Wagner | 220/4.14 X |
| 5,129,544 A | * | 7/1992 | Jacobson et al. | 220/562 |
| 5,344,038 A | * | 9/1994 | Freeman et al. | 220/562 X |
| 5,547,096 A | * | 8/1996 | Kleyn | 220/4.14 |

\* cited by examiner

Primary Examiner—Steven Pollard
(74) Attorney, Agent, or Firm—Mayer Brown Rowe & Maw

(57) ABSTRACT

A fuel tank for a motor vehicle, having a wall (3) which is manufactured from plastic, in particular by injection molding, is provided on its inside with a permeation barrier (4). The permeation barrier (4) is manufactured from a material which is virtually impenetrable for fuel vapors. The permeation barrier (4) is composed of shell parts (5, 6) which are welded to one another.

3 Claims, 2 Drawing Sheets

FUEL TANK FOR A MOTOR VEHICLE

FIELD OF THE INVENTION

The invention relates to a fuel tank for a motor vehicle, having a wall manufactured from plastic, in particular by injection molding.

Fuel tanks of this type are frequently used in today's motor vehicles and are therefore known. In this case, the fuel tank is generally composed of a plurality of shell parts which are manufactured by injection molding and are then welded to one another. This enables complicated fuel tank shapes to be produced very simply and built-in parts to be inserted in them. Furthermore, because its wall is made of plastic the fuel tank is of very low weight.

A disadvantage of the known fuel tank is that it is very permeable for fuel vapors. Fuel can therefore pass through the wall into the environment.

BRIEF SUMMARY OF THE INVENTION

The invention is based on the problem of designing a fuel tank of the type mentioned at the beginning in such a manner that it is of a particularly low weight and that as little fuel vapor as possible can penetrate the wall.

According to the invention, this problem is solved by at least one permeation barrier for fuel vapors being arranged on the wall.

This design means that fuel vapors cannot penetrate the wall, or can only do so in small amounts, in accordance with the design of the permeation barrier. In this case, the permeation barrier consists of a material having particularly low permeation for the fuel. Since the wall in the known fuel tank is manufactured from plastic, the fuel tank according to the invention is of a low weight and can be manufactured in virtually any desired shape.

The permeation barrier could be formed on the outside of the wall as a coat of paint, for example. Since the outside of the fuel tank mounted in the motor vehicle is subject to mechanical stresses, the permeation barrier may be damaged and fuel may permanently penetrate the wall. The permeation barrier particularly reliably and permanently prevents fuel from penetrating the wall if the permeation barrier is arranged on the inside of the wall manufactured from plastic. In addition, the application of the permeation barrier in current fuel tanks can take place before they are welded together, since the permeation barrier does not require any changes to or adaptations of fixing devices and connecting pieces arranged on the outside of the fuel tank.

The permeation barrier can be applied to the wall in a very simple manner during large-scale manufacturing of the fuel tank according to the invention if said barrier has a film manufactured from a particularly permeation-tight material.

According to another advantageous development of the invention, the permeation barrier contributes to the stability of the wall if the permeation barrier has shell parts having particularly low permeability for fuel vapors.

According to another advantageous development of the invention, the wall is virtually impenetrable for fuel if the permeation barrier is manufactured from metal. Sheet steel or sheet aluminum, for example, are suitable in this case.

According to another advantageous development of the invention, a contribution is made to further reducing the weight of the wall if the permeation barrier is manufactured from a particularly permeation-tight plastic. In this case, the permeation barrier may, of course, be of multilayered construction. The permeation barrier manufactured from plastic or from metal may, for example, be inserted into the injection mold of the shell parts for the wall and subsequently encapsulated by injection molding.

Lines and components to be fitted in today's fuel tanks can be arranged in the fuel tank in a simple manner if lines and components to be installed in the fuel tank are fixed to the permeation barrier.

A seal, for example, could be arranged between two abutting regions of shell parts of the permeation barrier. However, according to another advantageous development of the invention, a seal of this type can be avoided if the shell parts are welded to one another at their abutting regions.

BRIEF DESCRIPTION OF THE DRAWINGS

The invention permits numerous embodiments. To further clarify its basic principle a number of these are illustrated in the drawing and are described in the text below. In the drawing

DETAILED DESCRIPTION OF THE INVENTION

Figure 1:
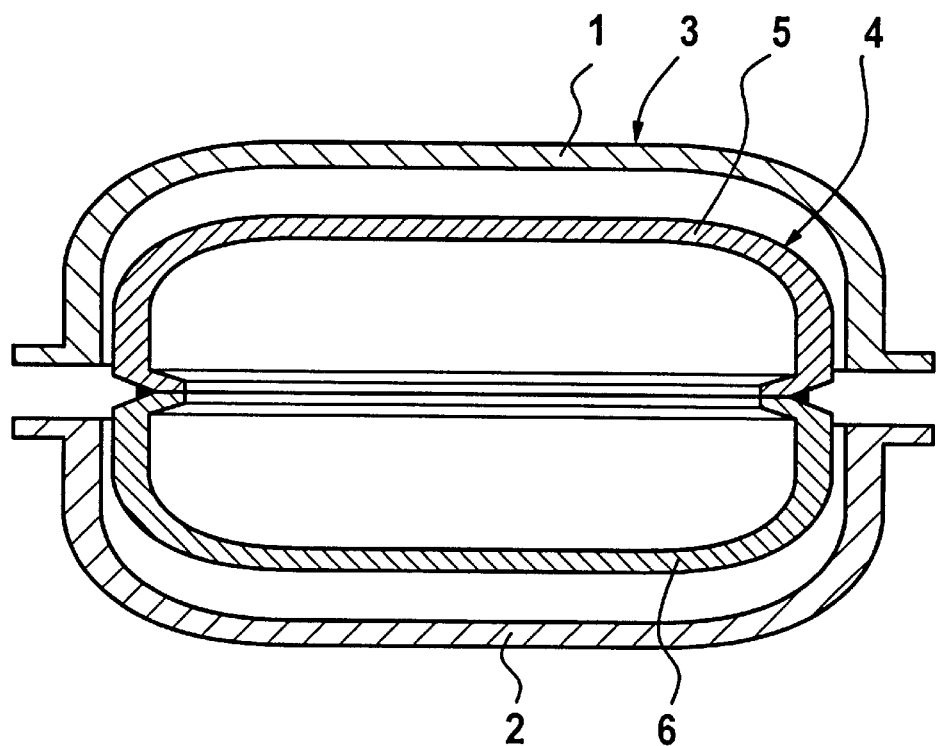
FIG. 1 shows, schematically, a fuel tank according to the invention having shell parts manufactured from plastic by injection molding.

FIG. 1 shows, schematically, a fuel tank according to the invention for a motor vehicle during its assembly. To simplify the drawing, filler necks or components to be arranged within the fuel tank are not illustrated. The fuel tank has a wall 3 which is manufactured from two shell parts 1, 2, and a permeation barrier 4 arranged in it. The permeation barrier 4 has two shell parts 5, 6 which are bonded to one another and have particularly low permeability for fuel vapors. The shell parts 5, 6 of the permeation barrier 4 can be manufactured, for example, from plastic or from metal and have an external contour corresponding to the internal contour of the outer shell parts 1, 2.

Figure 2:
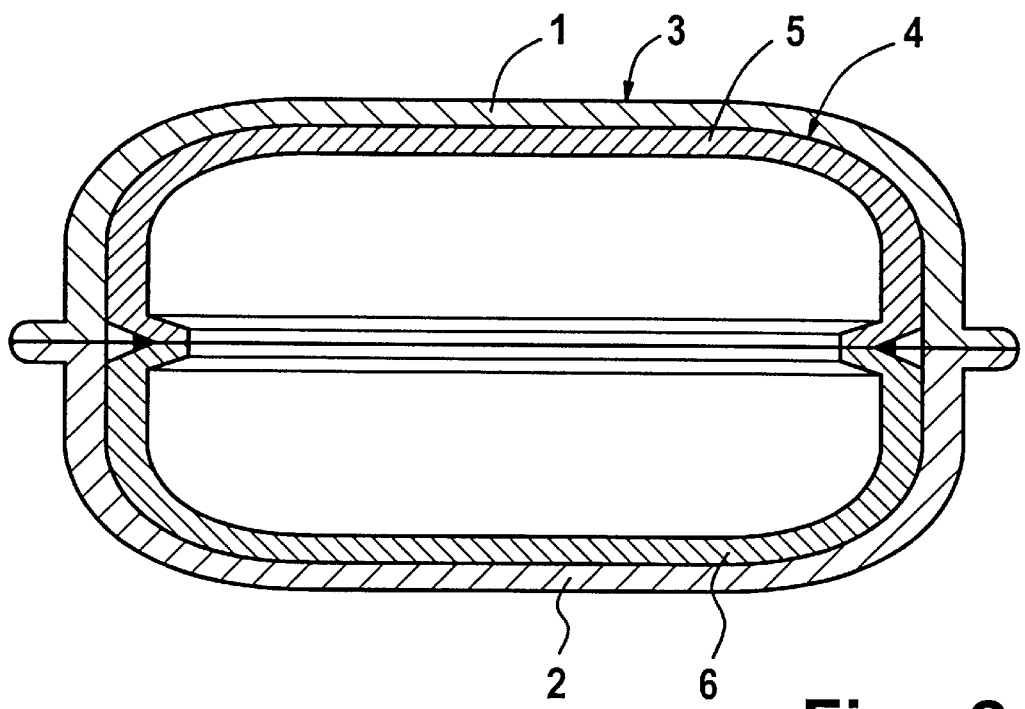
FIG. 2 shows the fuel tank from FIG. 1 after the shell parts are welded together.

FIG. 2 shows the fuel tank from FIG. 1 after the outer shell parts 1, 2 of the wall 3 have been welded together. The outer shell parts 1, 2 ensure that the wall 3 is sufficiently stable. In this connection, a known fuel tank, for example, can be retrofitted by the use of the appropriately shaped permeation barrier 4.

Figure 3:
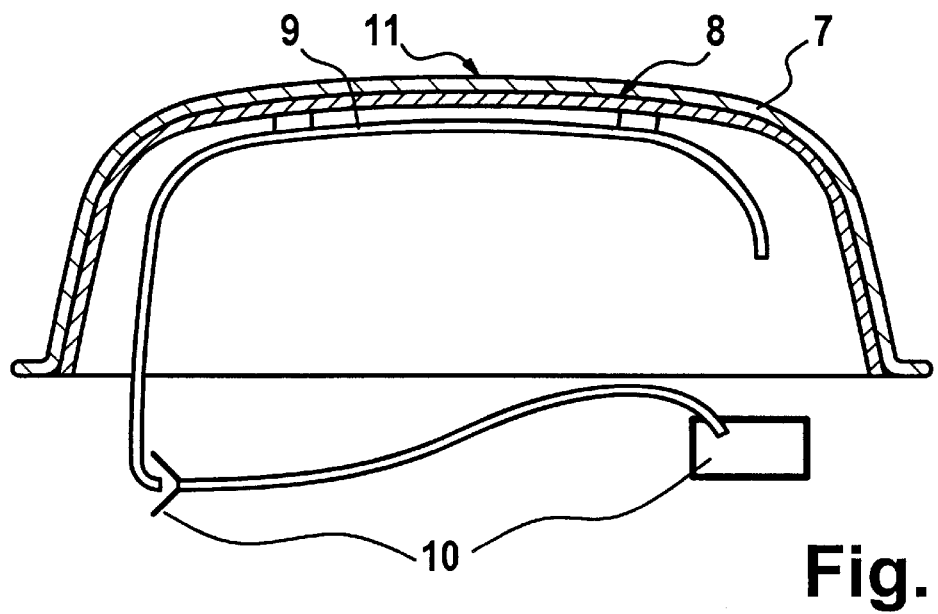
FIG. 3 shows a shell part of a further embodiment of the fuel tank according to the invention.

FIG. 3 shows an upper region of a wall 11 of a further embodiment of the fuel tank according to the invention, in which a shell part 7, which is manufactured from plastic by injection molding, is provided on its inside with a permeation barrier 8. In this case, the permeation barrier 8 serves as a fixing device for lines 9 and components 10, designed as an anti-surge cap or as a self-priming ejector, which are to be arranged in the fuel tank.

Figure 4:
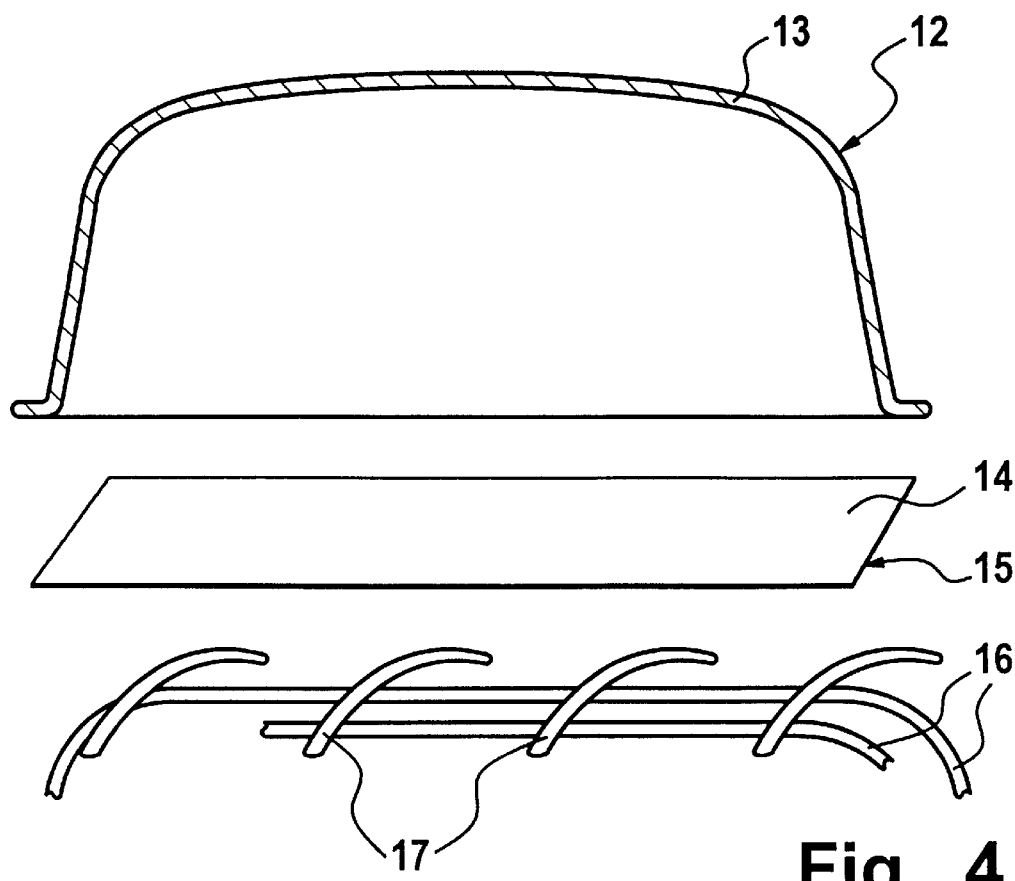
FIG. 4 shows a number of components for an upper half of a further embodiment of the fuel tank according to the invention.

FIG. 4 shows, schematically, the construction of a wall 12 of a further embodiment of the fuel tank according to the invention before it is assembled. The wall 12 has a shell part 13 which is manufactured from plastic by injection molding. The inside of the shell part 13 can be provided with a permeation barrier 15 formed as a film 14. The film 14 can be adapted for this to the inner contour of the shell part 13, for example by heating, and can subsequently be bonded to said shell part. After installation of the film 14, lines 16 which are to be arranged in the fuel tank are fixed to the permeation barrier 15. The lines 16 are fixed to retaining clips 17 for joint installation.

What we claim is:

1. A fuel tank for a motor vehicle comprising:
   (a) two mating tank shell parts having exterior and interior surfaces joined along a common seam to define an enclosed volume,
   (b) a fuel vapor permeation barrier constructed of two mating shell parts having exterior and interior surfaces joined along a common seam, the shell parts being manufactured separately from the tank shell parts and inserted within the tank shell part volume, wherein the contours of the external surfaces of the permeation barrier shell parts and of the interior surfaces of the tank shell parts are identical, to provide complete areal contact therebetween.

2. The fuel tank as claimed in claim 1, wherein the permeation barrier is manufactured from plastic.

3. The fuel tank as claimed in claim 1 wherein the permeation barrier is manufactured from metal.

* * * * *